United States Patent
Chari et al.

(10) Patent No.: US 10,599,837 B2
(45) Date of Patent: Mar. 24, 2020

(54) DETECTING MALICIOUS USER ACTIVITY

(71) Applicant: International Business Machines Corporation, Armonk, NY (US)

(72) Inventors: Suresh N. Chari, Tarrytown, NY (US); Ted A. Habeck, Fishkill, NY (US); Ian M. Molloy, Chappaqua, NY (US); Youngja Park, Princeton, NJ (US); Josyula R. Rao, Briarcliff Manor, NY (US); Wilfried Teiken, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 15/086,690

(22) Filed: Mar. 31, 2016

(65) Prior Publication Data
US 2017/0286671 A1  Oct. 5, 2017

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC .. G06F 21/55; G06F 21/552; G06F 2221/034; H04L 63/1416; H04L 63/1408; H04L 63/1441; H04L 63/1458
USPC .......................................................... 726/23
See application file for complete search history.

(56) References Cited

U.S. PATENT DOCUMENTS

| | | | |
|---|---|---|---|
| 8,375,452 B2* | 2/2013 | Raviv | G06F 21/316 726/25 |
| 9,202,049 B1* | 12/2015 | Book | G06F 21/56 |
| 9,509,688 B1* | 11/2016 | Magi Shaashua | H04L 63/0861 |
| 9,576,130 B1* | 2/2017 | Book | H04L 63/20 |
| 10,108,803 B2* | 10/2018 | Chari | G06F 21/577 |
| 2008/0271143 A1* | 10/2008 | Stephens | H04L 41/5061 726/22 |
| 2010/0198660 A1* | 8/2010 | Armstrong | G06Q 10/0635 705/7.28 |
| 2012/0071131 A1* | 3/2012 | Zisapel | H04L 63/1408 455/410 |
| 2013/0097701 A1* | 4/2013 | Moyle | G06F 21/552 726/22 |
| 2013/0124258 A1* | 5/2013 | Jamal | G06Q 30/02 705/7.29 |
| 2014/0041055 A1* | 2/2014 | Shaffer | G06Q 10/10 726/28 |

(Continued)

*Primary Examiner* — Alexander Lagor
*Assistant Examiner* — Sanchit K Sarker
(74) *Attorney, Agent, or Firm* — Yee & Associates, P.C.

(57) ABSTRACT

Detecting malicious user activity is provided. A profile for a user that accesses a set of protected assets is generated based on static information representing an organizational view and associated attributes corresponding to the user and based on dynamic information representing observable actions made by the user. A plurality of analytics is applied on the profile corresponding to the user to generate an aggregate risk score for the user accessing the set of protected assets based on applying the plurality of analytics on the profile of the user. A malicious user activity alert is generated in response to the aggregate risk score for the user accessing the set of protected assets being greater than an alert threshold value. The malicious user activity alert is sent to an analyst for feedback.

18 Claims, 9 Drawing Sheets

(56) References Cited

U.S. PATENT DOCUMENTS

| | | | |
|---|---|---|---|
| 2015/0007318 A1* | 1/2015 | Van De Van | G06F 12/1491 |
| | | | 726/23 |
| 2015/0242623 A1* | 8/2015 | Lindo | G06F 21/552 |
| | | | 726/23 |
| 2016/0065594 A1* | 3/2016 | Srivastava | H04L 63/1433 |
| | | | 726/23 |
| 2016/0119375 A1* | 4/2016 | Kong | H04L 67/06 |
| | | | 726/23 |
| 2017/0054744 A1* | 2/2017 | Mumcuoglu | H04L 63/1441 |
| 2017/0286671 A1* | 10/2017 | Chari | G06F 21/552 |
| 2018/0025157 A1* | 1/2018 | Titonis | G06F 21/56 |
| | | | 726/24 |

* cited by examiner

DETECTING MALICIOUS USER ACTIVITY

BACKGROUND

1. Field

The disclosure relates generally to data processing system security and more specifically to detecting anomalous user activity or malicious user activity within a system based on an aggregate risk score.

2. Description of the Related Art

Security has become an increasing concern in data processing systems. A user profile typically may include information that characterizes a user's normal behavior. Anomaly detection refers to the problem of finding user behavior patterns that do not conform to expected user behavior. In other words, anomaly detection is used to identify deviations from normal user behavior patterns. Anomaly detection relies on the assumption that anomalous user behaviors might imply that a data processing system's security is being compromised in some way. Malicious user activity typically tries to cause problems within a data processing system. For example, malicious user activity using credentials of a privileged user may have a great impact on the security of a data processing system. A privileged user is implicitly highly trusted and requires access to sensitive systems to execute the user's day-to-day activities and functions. Thus, any anomalous or malicious user activity may lead to security events of high impact on a data processing system including theft of information, corruption of sensitive data, and the like.

SUMMARY

According to one illustrative embodiment, a computer-implemented method for detecting malicious user activity is provided. A computer generates a profile for a user that accesses a set of protected assets. The profile is generated based on static information representing an organizational view and associated attributes corresponding to the user and based on dynamic information representing observable actions made by the user. The computer applies a plurality of analytics on the profile corresponding to the user to generate an aggregate risk score for the user accessing the set of protected assets based on applying the plurality of analytics on the profile of the user. The computer generates a malicious user activity alert in response to the aggregate risk score for the user accessing the set of protected assets being greater than an alert threshold value. The computer sends the malicious user activity alert to an analyst for feedback. According to other illustrative embodiments, a computer system and computer program product for detecting malicious user activity are provided.

DETAILED DESCRIPTION

Figure 1:
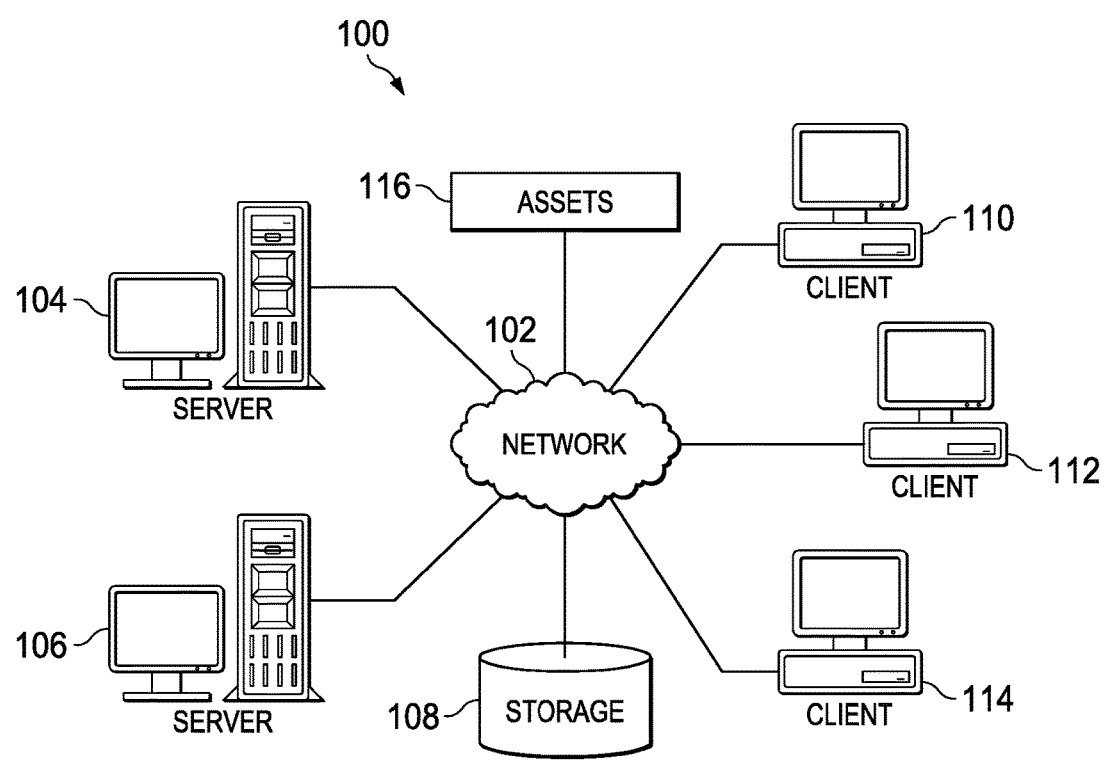
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
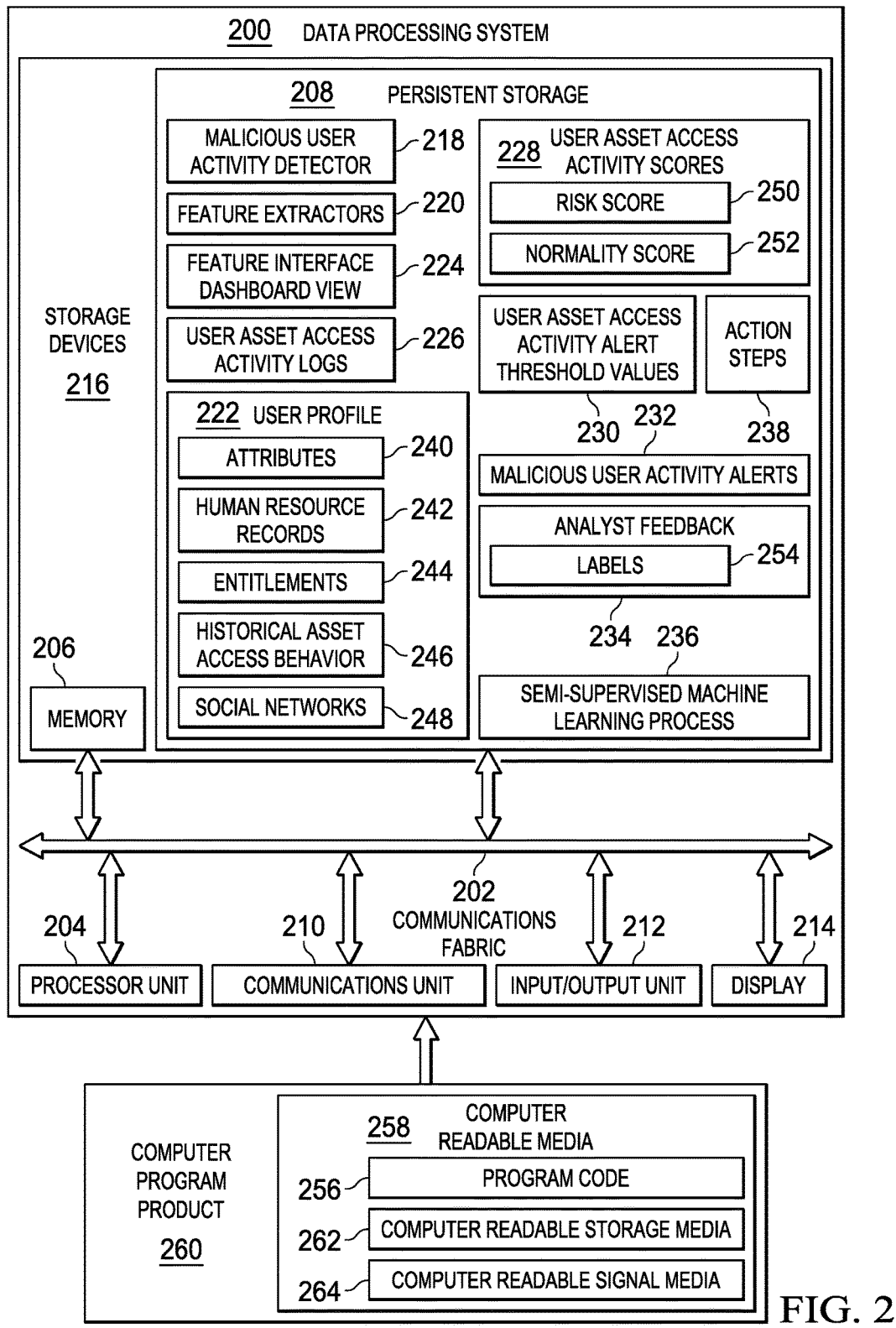
FIG. 2 is a diagram of a data processing system in which illustrative embodiments may be implemented.
Figure 3:
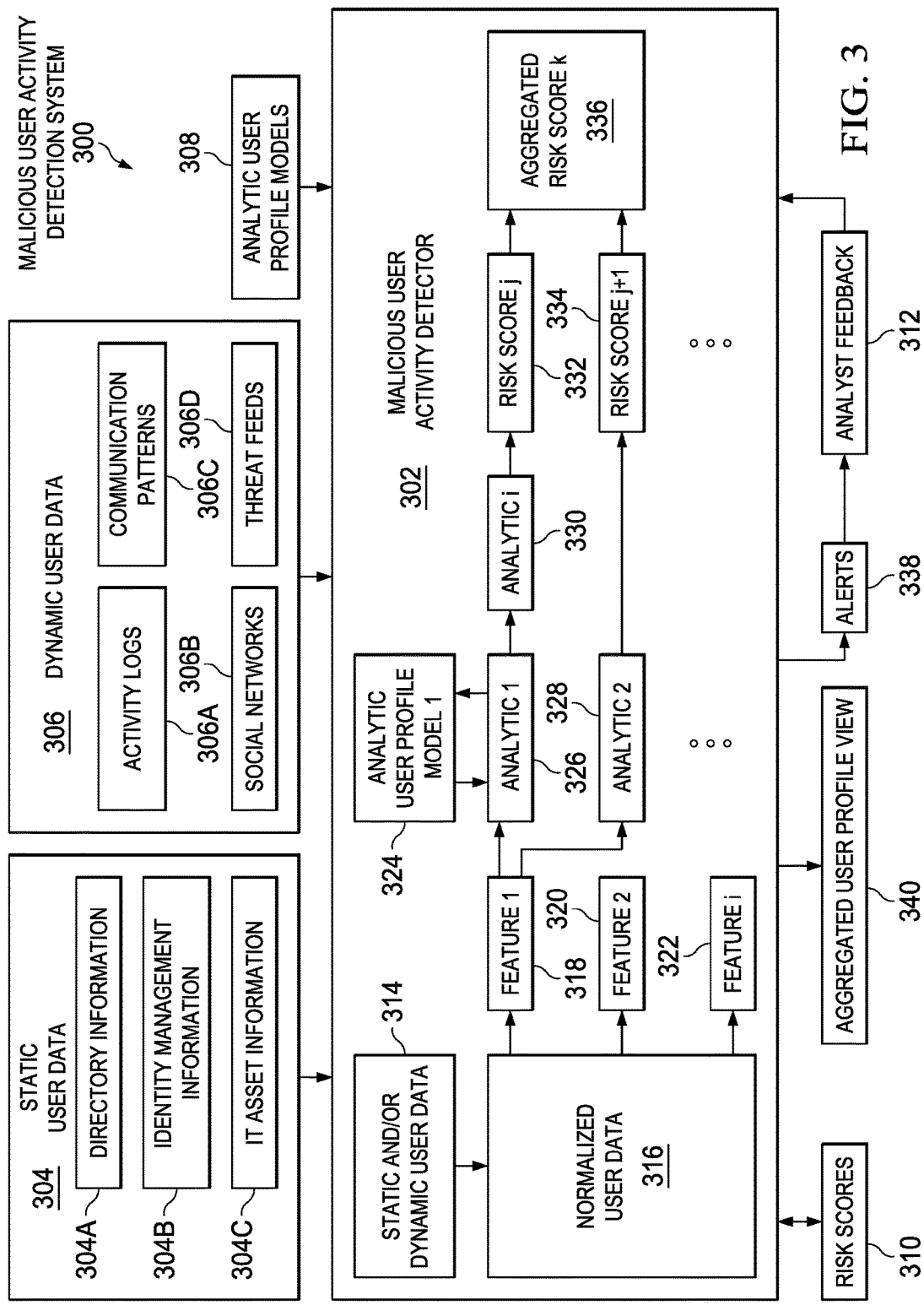
FIG. 3 is a diagram of a malicious user activity detection system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other assets in which the illustrative embodiments may be implemented. Network data processing system 100 contains network 102, which is the medium used to provide communications links between the computers, data processing systems, and assets connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services, such as, for example, services for automatically detecting malicious user asset access activity based on collected user profile information and user asset access activity logs. Further, in response to detecting malicious asset access activity by a particular user, server 104 or server 106 may block access to the protected assets by that particular user. In other words, in addition to automatically detecting malicious user asset access activity, server 104 and server 106 may protect the assets from attack.

Client device 110, client device 112, and client device 114 also connect to network 102. Client devices 110, 112, and 114 are clients of server 104 and server 106. Server 104 and server 106 may provide information, such as boot files, operating system images, and software applications to client devices 110, 112, and 114.

Client devices 110, 112, and 114 may be, for example, computers, such as desktop computers or network computers with wire or wireless communication links to network 102. However, it should be noted that client devices 110, 112, and 114 are intended as examples only. In other words, client devices 110, 112, and 114 also may include other devices, such as, for example, laptop computers, handheld computers, smart phones, smart watches, personal digital assistants, gaming devices, or any combination thereof.

Users of client devices 110, 112, and 114 may use client devices 110, 112, and 114 to access assets 116. Assets 116 may represent a plurality of different types of protected assets of an enterprise. The protected assets of the enterprise may be, for example, sensitive data, documents, hardware devices, such as processors and storage devices, software components, such as applications and programs, networks, network communication devices, and the like.

Storage 108 is a network storage device capable of storing any type of data in a structured format or an unstructured format. In addition, storage 108 may represent a set of one or more network storage devices. Storage 108 may store, for example, names and identification numbers of a plurality of users, profiles corresponding to the plurality of users, user asset access activity logs, user asset access activity scores, user asset access activity alert threshold values, malicious user activity alerts, and the like. Further, storage unit 108 may store other data, such as authentication or credential data that may include user names, passwords, and biometric data associated with analysts and system administrators.

In addition, it should be noted that network data processing system 100 may include any number of additional server devices, client devices, other devices, and assets not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores malicious user activity detector 218. Malicious user activity detector 218 monitors user activity logs corresponding to access of a set of one or more assets by a user to identify and block malicious or anomalous user behavior by generating a risk score for the access based on a profile corresponding to the user accessing the set of assets. Instead of, or in addition to, blocking the detected malicious user activity, malicious user activity detector 218 may forward the detected malicious user activity to an appropriate risk management system and/or a risk analyst. It should be noted that even though malicious user activity detector 218 is illustrated as residing in persistent storage 208, in an alternative illustrative embodiment malicious user activity detector 218 may be a separate component of data processing system 200. For example, malicious user activity detector 218 may be a hardware component coupled to communication fabric 202 or a combination of hardware and software components.

Also in this example, persistent storage 208 stores feature extractors 220, user profile 222, feature interface dashboard view 224, user asset access activity logs 226, user asset access activity scores 228, user asset access activity alert threshold values 230, malicious user activity alerts 232, analyst feedback 234, semi-supervised machine learning process 236, and action steps 238. However, it should be noted that alternative illustrative embodiments may include more or less data and processes than illustrated.

Malicious user activity detector 218 may utilize feature extractors 220 to extract user features from user profile 222, such as, for example, attributes 240, which are found in human resource records 242. Attributes 240 also may be found in employee directory information of the enterprise. Attributes 240 provide basic information, such as name, identification number, employer, demographic information, et cetera, corresponding to a user associated with user profile 222. Feature extractors 220 also may extract entitlements 244, historical asset access behavior 246, and social networks 248.

Entitlements 244 may include, for example, asset access privileges of the user, roles assigned to the user, and work-related groups the user belongs to. Historical asset access behavior 246 provides a record of the user's past behavior in accessing protected assets. Social networks 248 represent the networks that the user belongs to, such as work-related networks of friends and co-workers and social networks of friends and family.

Malicious user activity detector 218 may utilize feature interface dashboard view 224 to provide an analyst with an aggregated profile view of the user that comprises a plurality of different views, such as, for example, a basic user view, an identity management view, a social networks view, a behavior view, and an operational view. User asset access activity logs 226 represent a historical record of current and past asset access behavior by the user.

Malicious user activity detector 218 may generate user asset access activity scores 228 for each asset access by the user. User access activity scores 228 may include risk score 250 and normality score 252. Risk score 250 represents a level of risk associated with the user accessing a protected asset. Normality score 252 represents a level of normalcy regarding the user accessing the protected asset.

Malicious user activity detector 218 may compare user asset access activity scores 228 with user asset access activity alert threshold values 230. If user asset access activity scores 228 are greater than user asset access activity alert threshold values 230, then malicious user activity detector 218 may generate one or more malicious user activity alerts 232. Malicious user activity alerts 232 indicate that the user is suspected of aberrant asset access behavior.

In addition, malicious user activity detector 218 may send malicious user activity alerts 232 to one or more analysts for analyst feedback 234. Malicious user activity detector 218 may utilize analyst feedback 234 to determine whether malicious user activity alerts 232 are valid or invalid alerts or whether one or more of malicious user activity alerts 232 may require further processing or analyst follow up.

In this example, analyst feedback 234 includes labels 254. However, illustrative embodiments are not restricted to such. For example, alternative illustrative embodiments may utilize tags or other types of alert identifiers in addition to, or instead of, labels 254. The analysts associate or attach labels 254 to malicious user activity alerts 232. Labels 254 may include, for example, "INVESTIGATE," "CONFIRMED," or "NORMAL USER ASSET ACCESS BEHAVIOR."

Further, malicious user activity detector 218 may send malicious user activity alerts 232 with attached labels 254 to semi-supervised machine learning process 236. Malicious user activity detector 218 may utilize semi-supervised machine learning process 236 to decrease the number of false positives in malicious user activity alerts 232.

Malicious user activity detector 218 may perform one or more of action steps 238 in response to determining that one or more of malicious user activity alerts 232 are valid alerts. An example action step may be for malicious user activity detector 218 to block access to the asset by the user. Another example action step may be for malicious user activity detector 218 to allow access to the asset by the user in response to malicious user activity detector 218 determining that the benefit of the user accessing the asset is greater than the risk associated with the user accessing the asset.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 256 is located in a functional form on computer readable media 258 that is selectively removable and may be loaded onto or transferred to data processing system 200 for running by processor unit 204. Program code 256 and computer readable media 258 form computer program product 260. In one example, computer readable media 258 may be computer readable storage media 262 or computer readable signal media 264. Computer readable storage media 262 may include, for example, an optical or magnetic disc that is inserted or placed into a drive or other device that is part of persistent storage 208 for transfer onto a storage device, such as a hard drive, that is part of persistent storage 208. Computer readable storage media 262 also may take the form of a persistent storage, such as a hard drive, a thumb drive, or a flash memory that is connected to data processing system 200. In some instances, computer readable storage media 262 may not be removable from data processing system 200.

Alternatively, program code 256 may be transferred to data processing system 200 using computer readable signal media 264. Computer readable signal media 264 may be, for example, a propagated data signal containing program code 256. For example, computer readable signal media 264 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 256 may be downloaded over a network to persistent storage 208 from another device or data processing system through computer readable signal media 264 for use within data processing system 200. For instance, program code stored in a computer readable storage media in a data processing system may be downloaded over a network from the data processing system to data processing system 200. The data processing system providing program code 256 may be a server computer, a client computer, or some other device capable of storing and transmitting program code 256.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 262 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that current solutions to data processing system security issues involve writing manually crafted rules based on heuristics, which typically reflect known or anticipated malicious attacks, to detect malicious attacks. Other approaches are aimed at detecting known malicious attacks from inferences derived from previously known malicious attacks. These approaches are incapable of detecting unknown or unanticipated malicious attacks. Unsupervised machine learning-based analytics, which detect unknown or unanticipated malicious attacks, suffer from high false positive rates. In many cases, such malicious attack detection is slow and cannot scale to handle large volumes of data or produce results soon after the security incident happens. Thus, problems with prior malicious attack detection approaches are accuracy, scalability, latency, speed to deployment, and an ability to address new malicious attack threats, which illustrative embodiments address. Illustrative embodiments are capable of detecting when a user access activity is maliciously, willful, or otherwise.

One aspect of illustrative embodiments is the aggregation of multiple sources of user information into a comprehensive user profile. Many sources of user information exist, which illustrative embodiments may utilize to generate a snapshot of user activity. For example, illustrative embodiments may utilize static sources of user information, such as: 1) an enterprise's directory of user attributes, which may include a user's human resources records; 2) identity management information corresponding to the user, which may include user identifications or accounts that have been provisioned for the user, the entitlements that have been provisioned for the user in various enterprise assets, such as protected resources and applications, the work-related groups the user is a part of, as well as, the roles the user is assigned to and performs; 3) the information technology assets that correspond to the user; and 4) the social networks that the user belongs to.

To this static view of the user's attributes, illustrative embodiments may aggregate the following dynamic sources of information corresponding to the user, such as: 1) work-related activity that the user performs on a range of enterprise assets, such as protected resources and applications; 2) communication patterns of the user on the social networks that the user belongs to; and 3) external threat feeds, such as software vulnerabilities. For example, an application may contain a software bug that that may be exploited, creating a vulnerability. As a result, an application containing a vulnerability may be exploited by a malicious user.

Illustrative embodiments collect and aggregate the static and dynamic sources of user information, apply a set of analytic processes on the aggregated data to score user activity on each protected asset for malicious behavior. Further, illustrative embodiments increase accuracy of detecting malicious user activity by correlating such user activity with the static user attributes. Furthermore, illustrative embodiments improve insight into malicious user activity detection by correlating behavior of the user with information regarding various enterprise assets, such as protected resources and applications.

Illustrative embodiments process the aggregated user data and score user activity to detect malicious user activity by providing features, such as: 1) support for streaming and batch user data; 2) a generalized feature interface; 3) flexible hierarchical feature extractors; 4) time series-based preprocessing; and 5) pipelined analytics execution. These illustrative embodiment features are suitable for handling multiple assets. Illustrative embodiments score each of the multiple assets using a set of multiple analytics. All of the multiple analytics operate as soon as relevant data is available to yield near real-time scoring of asset user activity.

The feature interface of illustrative embodiments allows for a range of behavioral analytics for individual application, which can implement auto correlation (i.e., correlation of user activity in a current time window against the user's activity in past time windows) and cross-correlation (i.e., comparison of a user's activity against activity of other members in the user's work-related peer group).

An analytic component of illustrative embodiments takes a series of malicious user activity alerts generated by the analytics and applies a series of elimination and consolidation steps. This analytic component achieves a reduction in false positives and a reduction in total number of malicious user activity alerts. This analytic component achieves this reduction through analysis and correlation of malicious user activity alerts and feedback mechanisms from prior malicious user activity alerts. Another analytic component may implement sophisticated risk models for aggregating multiple malicious user activity alerts. By correlating the aggregated multiple malicious user activity alerts with static data from the comprehensive user profile, illustrative embodiments may greatly improve the accuracy of detecting malicious user activity.

User profiling is a process of aggregating information for specific users and has been used for personalization and recommender systems. Different systems benefit from different kinds of user information. For example, a recommender system collects information about a user's friends and recommends similar items or activities associated with the friends to the user. In contrast, a personalization system, such as, for example, a search personalization system, focuses on a user's past preferences in using the system.

User profiling for detecting malicious user activity is very different from these personalization and recommender systems. For malicious user activity detection, illustrative embodiments take into account a broader range of user information sources, such as, for example, human resource records of an enterprise that may include information regarding the user's attributes, the user's privileges, the user's activities in multiple asset environments, the user's social networks, and the user's historical behaviors, and then correlate these multiple sources of user information. Illustrative embodiments define and extract the user information from the multiple sources to provide a feature interface dashboard view of the user's attributes, social networks, and behaviors. The feature interface dashboard view may include a plurality of different views, such as, for example, a basic user information view, a user identity management view, a configuration management database view, a user social networks view, a user behavior view, and a user operational view.

Illustrative embodiments receive input data corresponding to a user accessing a set of protected assets in a steam of data or a batch of data, for example. Illustrative embodiments then may aggregate the received input data corresponding to the user into a set of one or more defined windows based on time and/or the user. Illustrative embodiments extract features from the aggregated input data corresponding to the user and feed the extracted features into selected analytics of a plurality of analytics for processing. In addition, illustrative embodiments determine whether other analytics in the plurality of analytics depend on a data output of the selected analytics. In response to determining that other analytics in the plurality of analytics depend on the data output of the selected analytics, illustrative embodiments feed the extracted features into the other analytics. Further, illustrative embodiments collect the data outputs of the plurality of analytics processing the extracted features.

With reference now to FIG. 3, a diagram of a malicious user activity detection system is depicted in accordance with an illustrative embodiment. Malicious user activity detection system 300 may be implemented in a network of data processing systems, such as network data processing system 100 in FIG. 1.

Malicious user activity detection system 300 includes malicious user activity detector 302. Malicious user activity detector 302 may be, for example, malicious user activity detector 218 of data processing system 200 in FIG. 2. In addition, malicious user activity detector 302 may be implemented in a server device, such as, for example, server 104 in FIG. 1. Malicious user activity detector 302 may receive input, such as, for example, static user data 304, dynamic user data 306, analytic user profile models 308, risk scores 310, and analyst feedback 312. Malicious user activity detector 302 may receive this input from a plurality of data sources connected to a network, such as, for example, server 106, storage 108, and clients 110-114 connected to network 102 in FIG. 1.

Static user data 304 may include information, such as, for example, directory information 304A, identity management information 304B, and information technology information 304C. Directory information 304A may include basic information regarding a user and may be obtained from an enterprise's employee directory database. Identity management information 304B may include information, such as, for example, entitlement information, regarding a user's ability to access protected assets of the enterprise. Information technology information 304C may include information regarding information technology devices and resources the user owns or is assigned to manage by the enterprise.

Dynamic user data 306 may include information, such as, for example, activity logs 306A, social networks 306B, communication patterns 306C, and threat feeds 306D. Activity logs 306A include records of the user's asset access behavior. Social networks 306B include information regarding which social networks and work-related networks the user is a member of. Communication patterns 306C indicate the user's typical network communication and asset access patterns of the user. Threat feeds 306D include information regarding known threats to assets corresponding to the user's typical asset access behavior patterns.

Analytic user profile models 308 include defined models for pipelining analytics of malicious user activity detector 302 to score user asset access activity against generated profiles for users. Risk scores 310 may represent risk scores generated by other risk assessment systems regarding asset access activities by the same or similar users.

Malicious user activity detector 302 collects the static and/or the dynamic user data at 314. In addition, malicious user activity detector 302 may normalize the collected user data at 316 by, for example, removing irrelevant data and/or corrupted data. Further, malicious user activity detector 302 may use feature extractors, such as feature extractors 220 in FIG. 2, to extract feature 1 318, feature 2 320, through feature i 322 from the normalized user data. Furthermore, malicious user activity detector 302 may utilize analytic user profile model 1 324 to pipeline analytic 1 326, analytic 2 328, and analytic i 330 to score user asset access activity against the extracted features of the user's profile. It should be noted that malicious user activity detector 302 may include more analytics than illustrated. Also, it should be noted that analytics may include dependencies between the different analytics. If dependencies exist, all dependencies of a particular analytic must be executed prior to a subsequent analytic in the pipeline being able to execute. In addition, different analytics may execute in parallel, such as analytic 1 326 and analytic 2 328.

In this example, analytic 1 326 and analytic i 330 generate risk score j 332 and analytic 2 328 generates risk score j+1 334. Risk score j 332 and risk score j+1 334 may be, for example, user asset access activity scores 228 in FIG. 2. Malicious user activity detector 302 combines risk score j 332 and risk score j+1 334 to generate aggregated risk score k 336. Aggregated risk score k 336 represents the level of risk associated with a particular user accessing a set of one or more protected assets of an enterprise.

If malicious user activity detector 302 determines that aggregated risk score k 336 is greater than an alert threshold, such as, for example, an alert threshold in user asset access activity alert threshold values 230 in FIG. 2, then malicious user activity detector 302 may generate one or more alerts 338. Alerts 338 may be, for example, malicious user activity alerts 232 in FIG. 2. Further, malicious user activity detector 302 may send alerts 338 for analyst feedback 312 to determine, for example, whether individual alerts in alerts 338 are valid or invalid alerts. Furthermore, malicious user activity detector 302 may display aggregated user profile view 340 to analysts to help in providing analyst feedback 312. Aggregated user profile view 340 may be, for example, feature interface dashboard view 224 in FIG. 2.

Malicious user activity detector 302 processes user profile data, as well as, user asset access activity logs corresponding to the user, in a flexible fashion to support analysis of multiple assets and data types. Further, Malicious user activity detector 302 scales to support near real-time scoring of user activity data for most assets. Malicious user activity detector 302 detects malicious user activity by providing: 1) support for streaming and batch user data; 2) a feature interface dashboard view; 3) flexible hierarchical feature extractors; 4) time series-based preprocessing; and 5) pipelined analytics execution.

Regarding support for streaming and batch data, malicious user activity detector 302 may accept input data both in batches (e.g., data files covering specified periods of time) and as a stream (e.g., a continuous series of messages in order by time). In addition, malicious user activity detector 302 is capable of processing input data that is not completely time-ordered by creating temporary caches for data relating to a defined data input time period and processing these data as soon as a heuristic decides that it is unlikely that more input data for the defined time period will arrive in the future.

Regarding the feature interface dashboard view, malicious user activity detector 302 may utilize parameterizable feature extractors that will detect relevant pieces of information in the input data (e.g., dates, user names, action names, et cetera) and convert the extracted features into a format suitable for the analytics. Malicious user activity detector 302 also may allow parallel feature extraction of various representations of the same data to support multiple analytics on the same input data. Further, malicious user activity detector 302 may avoid unnecessary de-duplication of data by allowing shared representations of common features of the input data, which the multiple analytics may utilize, as long as avoiding de-duplication of data does not impact processing performance. Using these techniques, malicious user activity detector 302 may allow a degree of parallel processing of the analyzed input data, starting at feature extraction through aggregation of final analytics results.

Regarding hierarchical feature extractors, malicious user activity detector 302 may provide a set of flexible feature extractors that support a wide range of analytics. To integrate new analytics or new input data, malicious user activity detector 302 may employ an extensible configuration mechanism that allows fast adoption to new processing for the analytics developers by providing a program model, which may be a mixture of configuration components and derivation components in an object oriented programming sense, to reduce the time needed to deploy new analytics.

Regarding time series-based preprocessing, malicious user activity detector 302 may execute all processing based on abstract time series definitions. These abstract time series definitions allow malicious user activity detector 302 to determine conflict-free parallelization of both input data processing (i.e., feature extraction) and analytics execution. Malicious user activity detector 302 may slice all input data using various configurable time series definitions to allow optimization of both system throughput and time to response in terms of delay between providing the input data and providing the results of the analytics being run.

Regarding pipelined analytics execution, malicious user activity detector 302 may provide a framework to run the various analytics in a pipeline to allow synergy effects between various processes. Pipelined analytics execution is an ordered list of execution steps, along with all of the execution steps dependencies. All dependencies of an execution step must be completed before moving to the next execution step in the ordered list. Malicious user activity detector 302 may perform execution steps in parallel or in streams if dependencies are met. Malicious user activity detector 302 may optimize processing using various heuristics to balance between system throughout and time to response by the analytics. This involves analyzing the flow of data through the system to optimize between the overhead to transfer the new data to be processed and the time to actually process the data across the various analytics to balance the time gained by increasing parallelization of the analytics with the impact on the overall system throughput based on the increased data transfer overhead created by the increased parallelization.

It should be noted that false positives of analytics may affect the utility of malicious user activity detector 302. If the analytics generate too many false positives, then security personnel may begin to ignore alerts and allow malicious user activity to go unnoticed. Malicious user activity detector 302 may include processes to limit the number of alerts shown to the analysts, to incorporate analyst feedback to limit future false positives, and to suppress duplicate and redundant alerts.

Further, malicious user activity detector 302 may group malicious user activity alerts. Malicious user activity detector 302 may generate many similar and related malicious user activity alerts based on, for example, an analytic that operates on overlapping, sliding windows of time or an analytic that uses multiple sets of parameters, such as the number of groups of malicious user activity alerts, asset sensitivity levels, and the like. When defining an analytic, an analyst may define alert groups for the analytic. For each defined time period, malicious user activity detector 302 may generate a representative alert from each alert group. Alternatively, malicious user activity detector 302 may generate a new malicious user activity alert from each alert group, aggregating sub-alerts of the same type. An analyst may provide a priority to each analytic to weight its influence in the grouping of alerts.

Furthermore, malicious user activity detector 302 may obtain analyst feedback regarding generated malicious user activity alerts. An analyst may make zero or more responses to a generated malicious user activity alert using, for example, labels or tags, such as "INVESTIGATE," "CLOSE," "DUPLICATE," "CONFIRMED," "IGNORE ALERT FOR 'n' MONTHS," "NORMAL USER ASSET ACCESS BEHAVIOR," et cetera. When malicious user activity detector 302 generates new malicious user activity alerts, malicious user activity detector 302 may compare the new malicious user activity alerts to prior malicious user activity alerts that received analyst feedback for alert prioritization and possible alert suppression. For example, an analyst may indicate that the user asset access behavior is normal for a defined time window, such as, for example, three months because a particular task was delegated to that particular user requiring access to a particular asset. Moreover, malicious user activity detector 302 may prioritize prior malicious user activity alerts receiving positive analyst feedback responses, such as, for example, "CONFIRMED."

In addition, malicious user activity detector 302 may suppress duplicate malicious user activity alerts. In the absence of analyst feedback, malicious user activity detector 302 may compare new malicious user activity alerts to prior malicious user activity alerts in a variable length time window to identify related malicious user activity alerts. The analyst will define the length of the time window. If malicious user activity detector 302 generates a malicious user activity alert that is similar to a previously generated malicious user activity alert, then malicious user activity detector 302 may suppress the new malicious user activity alert. For example, malicious user activity detector 302 may suppress same or similar malicious user activity alerts occurring in different windows of time. An analyst may configure the alert suppression to re-raise malicious user activity alerts when their corresponding risk scores increase.

Malicious user activity detector 302 also may utilize semi-supervised machine learning processes, such as, for example, semi-supervised machine learning process 236 in FIG. 2. For example, malicious user activity detector 302 may feed the analyst feedback labels into analytics that are using semi-supervised learning. Feeding the analyst feedback labels into the analytics using semi-supervised learning may reduce the false positive rate and may prevent malicious user activity detector 302 from generating future false positive alerts. Semi-supervised machine learning is a class of supervised learning that makes use of unlabeled data for training. Typically, semi-supervised machine learning uses a small amount of labeled data with a large amount of unlabeled data for training. Unlabeled data, when used in conjunction with a small amount of labeled data, may produce considerable improvement in learning accuracy.

In addition, malicious user activity detector 302 may prioritize malicious user activity alerts using an adaptive risk function that trades off uncertainty of analytic models, past analyst feedback, potential benefits and risks of allowing user asset access, and a utility function. Prioritization of malicious user activity alerts produces a total or partial ordering of alerts for analysts to focus attention on the most pressing and significant malicious user activity alerts. A risk function may comprise multiple components, such as, for example, an analytic score, an accuracy of an analytic, asset value, a risk utility function, a user risk score, situational awareness, and action steps.

Regarding the analytic score, malicious user activity detector 302 may utilize analytics to generate risk scores that measure an amount of anomaly or normality corresponding to an asset access activity performed by a user. For example, the analytics may measure the significance of a user asset access behavioral deviation or determine the likelihood of seeing the observed user asset access behavior. The risk score is monotonically non-decreasing with respect to anomaly scores and monotonically non-increasing with normality scores. In other words, an increased risk score equals an increased risk of malicious user activity to the asset and an increased normality score equals a decreased risk of malicious user activity to the asset.

Regarding accuracy and precision of an analytic, malicious user activity detector 302 may utilize some analytics that produce more accurate results for detecting some types of anomalous user behavior than others. As analysts provide feedback, malicious user activity detector 302 may produce an approximate density function of the accuracy and precision of the analytic with respect to the corresponding risk score. Using this density function, malicious user activity detector 302 may estimate the amount of uncertainty that an alert may be a true positive alert given its corresponding risk score and past observed results. For example, a smaller number of analyst feedback samples (i.e., low density) results in higher levels of uncertainty in the corresponding risk score. In contrast, a larger number of analyst feedback samples (i.e., high density) results in a highly accurate probability that an alert is correct given the corresponding risk score. In other words, the analyst feedback increases confidence in the risk score.

Regarding the value of an asset, an enterprise may value some assets, such as specific data types, systems, applications, et cetera, more than others. A malicious user activity alert relating to a high value asset may result in increased levels of damage to the enterprise and, therefore, an increased level of risk in allowing user access to the high value asset. Similarly, malicious user activity detector 302 may provide a benefit function for allowing access to the asset the alert pertains to. For example, malicious user activity detector 302 may determine that allowing a particular user access to the high value asset corresponding to the alert may be beneficial to the enterprise based on current circumstances (e.g., the enterprise recently assigned that particular user to a work-related task that requires access to that particular asset for a defined period of time).

Regarding the risk utility function, different enterprises may have different levels of aversion to risk. A risk score combines the analytic uncertainty and the asset value, which also may contain uncertainty, to produce a risk-weighted expected harm to the asset. For example, the probability associated with the 50th percentile for the risk score and asset value for a risk neutral enterprise (i.e., an average risk estimate) or the 95th percentile for a risk adverse enterprise (i.e., a conservative risk estimate). Similarly, malicious user activity detector 302 also may calculate a benefit estimate for accessing the asset.

Regarding the user risk score, malicious user activity detector 302 may aggregate user-specific risk scores corresponding to all malicious user activity alerts and all assets associated with that particular user. By aggregating risk scores on a user-specific level, malicious user activity detector 302 may carry risk over from prior time periods (e.g., where the user has consistently behaved suspiciously) versus a time period where the user exhibited a sudden change behavior. Aggregating risk scores on a user-specific level prevents a user from staying below a defined alert threshold value.

Regarding situational awareness, malicious user activity detector 302 may dynamically alter the risk utility function and the alerting threshold values based on the situational awareness of the enterprise. For example, an enterprise that is currently under attack or under the threat of an attack may become more risk adverse and, therefore, malicious user activity detector 302 may lower the alerting threshold values. Conversely, as a project due date approaches, malicious user activity detector 302 may raise the alerting threshold values because users may exhibit an increased level of activity that malicious user activity detector 302 may otherwise view as suspicious. It should be noted that malicious user activity detector 302 may learn the situational awareness by comparing different user peer groups together.

Figure 4:
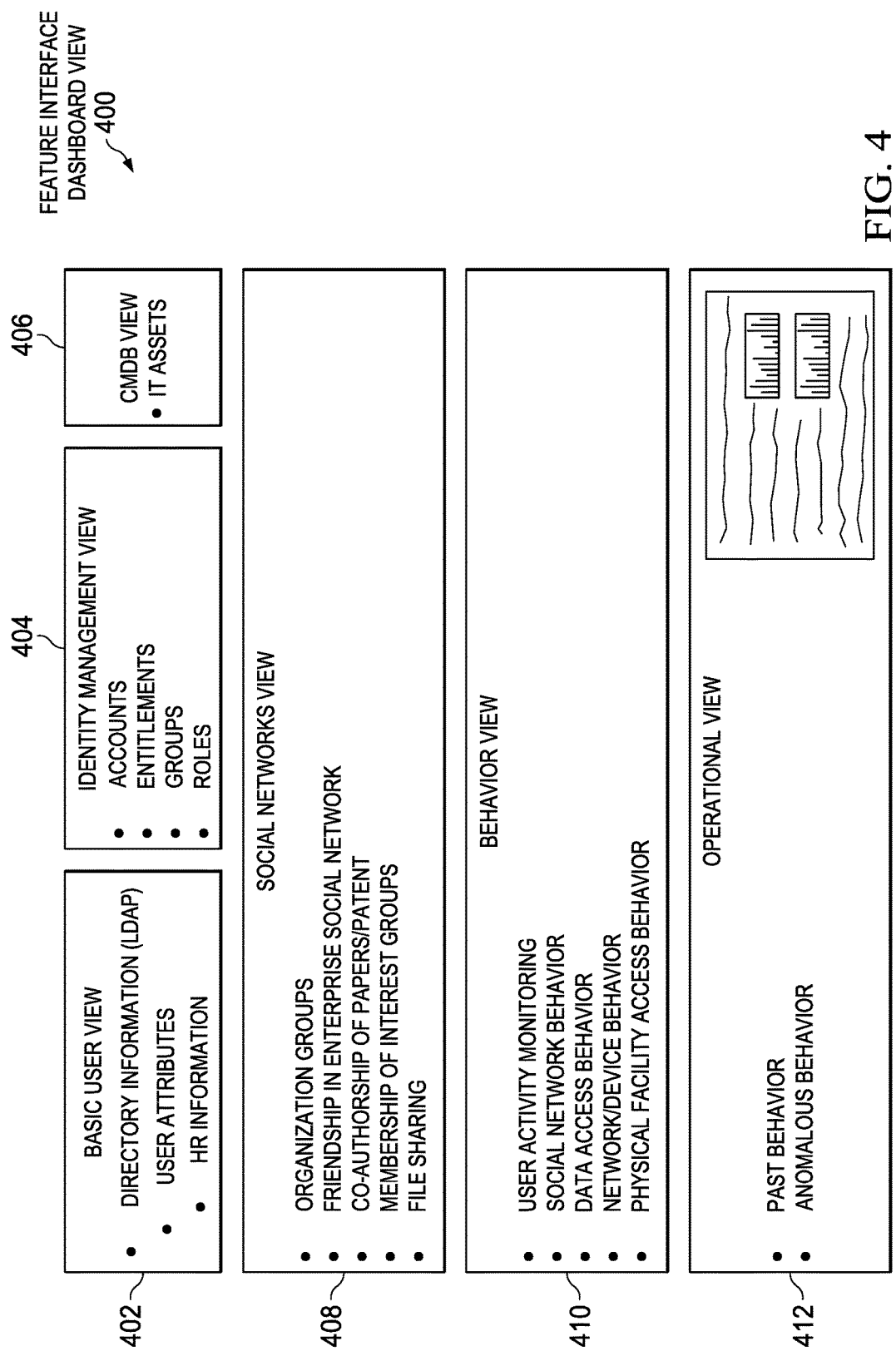
FIG. 4 is a diagram of an example feature interface dashboard view in accordance with an illustrative embodiment.

With reference now to FIG. 4, a diagram of an example feature interface dashboard view in accordance with an illustrative embodiment. Feature interface dashboard view 400 may be implemented in a computer, such as, for example, server 104 in FIG. 1 and data processing system 200 in FIG. 2. In addition, feature interface dashboard view 400 may be, for example, feature interface dashboard view 224 in FIG. 2 or aggregated user profile view 340 in FIG. 3.

In this example, feature interface dashboard view 400 includes basic user view 402, identity management view 404, configuration management database (CMBD) view 406, social networks view 408, behavior view 410, and operational view 412. However, illustrative embodiments are not restricted to such. In other words, alternative illustrative embodiments may include more or fewer views than illustrated. For example, alternative illustrative embodiments may combine two or more views into one view or divide a view into two or more views.

Basic user view 402 may provide basic attributes corresponding to a particular user, which may be found in human resource records and found in an enterprise's directory of employees. The directory information may be accessed via, for example, a Lightweight Directory Access Protocol (LDAP) that maintains distributed directory information services over an Internet Protocol (IP) network. Some examples of user attributes may include, for example, employment type, such as "regular full-time employee," "part-time employee," "contract employee," and the like, the department the user belongs to, the job responsibilities of the user, and the user's position, such as "administrator," "manager," "staff," and the like. A malicious user activity detector, such as, malicious user activity detector 218 in FIG. 2, also may calculate the depth of the user in the enterprise's organizational hierarchy to estimate how critical the user's position is.

Identity management view 404 may provide information regarding all the entitlements the user is assigned, including asset access account and privilege information, roles, and work-related groups. The malicious user activity detector may utilize this information to correlate the user's asset access behaviors. Further, the malicious user activity detector may utilize this information to reconcile the assigned privileges and actual usage of the privileges and determine over-privileged users and assignments to prevent possible misuse.

Configuration Management Database View 406 may provide information regarding all the information technology assets the user owns or administers. A configuration management database may store data regarding information technology (IT) assets. The malicious user activity detector may utilize the configuration management database to track the state of the different assets as the assets exist at specific points in time, as well as, the relationships between the different assets.

Social networks view 408 may provide the various different kinds of social networks the user is engaged in. The social networks may include organizational networks, social networks through co-authorship of papers and patents, social networks through project co-membership, social networks through file sharing, and friendships in enterprise social networks. The malicious user activity detector may investigate differences between a user's various social networks.

Behavior view 410 may provide a summarized view of monitored user activities and behaviors in multiple environments including social network activities, data access activities, network and device access behaviors, and physical facility access behaviors. Behavior view 410 provides a high-level picture and context of the user's various activities and helps identify suspicious user activities.

Operational view 412 may provide a summary of the user's past asset access behaviors. In addition, operational view 412 also may include anomalous past behaviors, if any exist.

Figure 5:
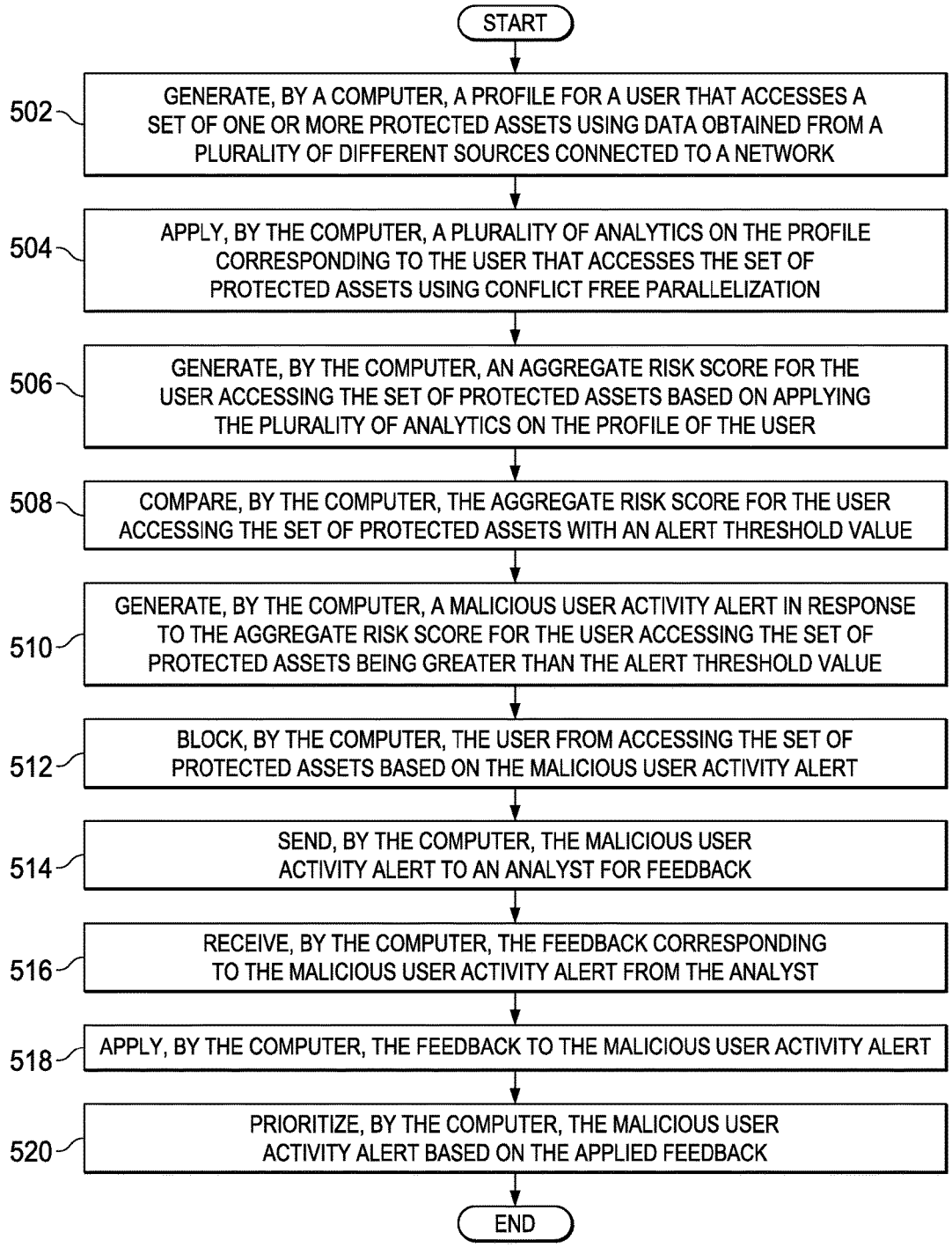
FIG. 5 is a flowchart illustrating a process for generating a malicious user activity alert in accordance with an illustrative embodiment.

With reference now to FIG. 5, a flowchart illustrating a process for generating a malicious user activity alert is shown in accordance with an illustrative embodiment. The process shown in FIG. 5 may be implemented in a computer, such as, for example, server 104 FIG. 1 and data processing system 200 in FIG. 2.

The process begins when the computer generates a profile for a user that accesses a set of one or more protected assets using data obtained from a plurality of different sources connected to a network (step 502). The profile for the user may be, for example, user profile 222 in FIG. 2. The set of one or more protected assets may be, for example, assets 116 in FIG. 1. The network may be, for example, network 102 in FIG. 1.

Subsequently, the computer applies a plurality of analytics on the profile corresponding to the user that accesses the set of protected assets using conflict free parallelization (step 504). The plurality of analytics may be, for example, analytic 1 326, analytic 2 328, and analytic i 330 in FIG. 3. Afterward, the computer generates an aggregate risk score for the user accessing the set of protected assets based on applying the plurality of analytics on the profile of the user (step 506). The aggregate risk score may be, for example, aggregated risk score k 336 in FIG. 3.

In addition, the computer compares the aggregate risk score for the user accessing the set of protected assets with an alert threshold value (step 508). The alert threshold value may be, for example, an alert threshold value in user asset access activity alert threshold values 230 in FIG. 2. Afterward, the computer generates a malicious user activity alert in response to the aggregate risk score for the user accessing the set of protected assets being greater than the alert threshold value (step 510). The malicious user activity alert may be, for example, one of malicious user activity alerts 232 in FIG. 2.

Further, the computer blocks the user from accessing the set of protected assets based on the malicious user activity alert (step 512). Furthermore, the computer sends the malicious user activity alert to an analyst for feedback (step 514). Subsequently, the computer receives the feedback corresponding to the malicious user activity alert from the analyst (step 516). The feedback may be, for example, analyst feedback 312 in FIG. 3.

Moreover, the computer applies the feedback to the malicious user activity alert (step 518). The computer also prioritizes the malicious user activity alert based on the applied feedback (step 520). Thereafter the process terminates.

Figure 6:
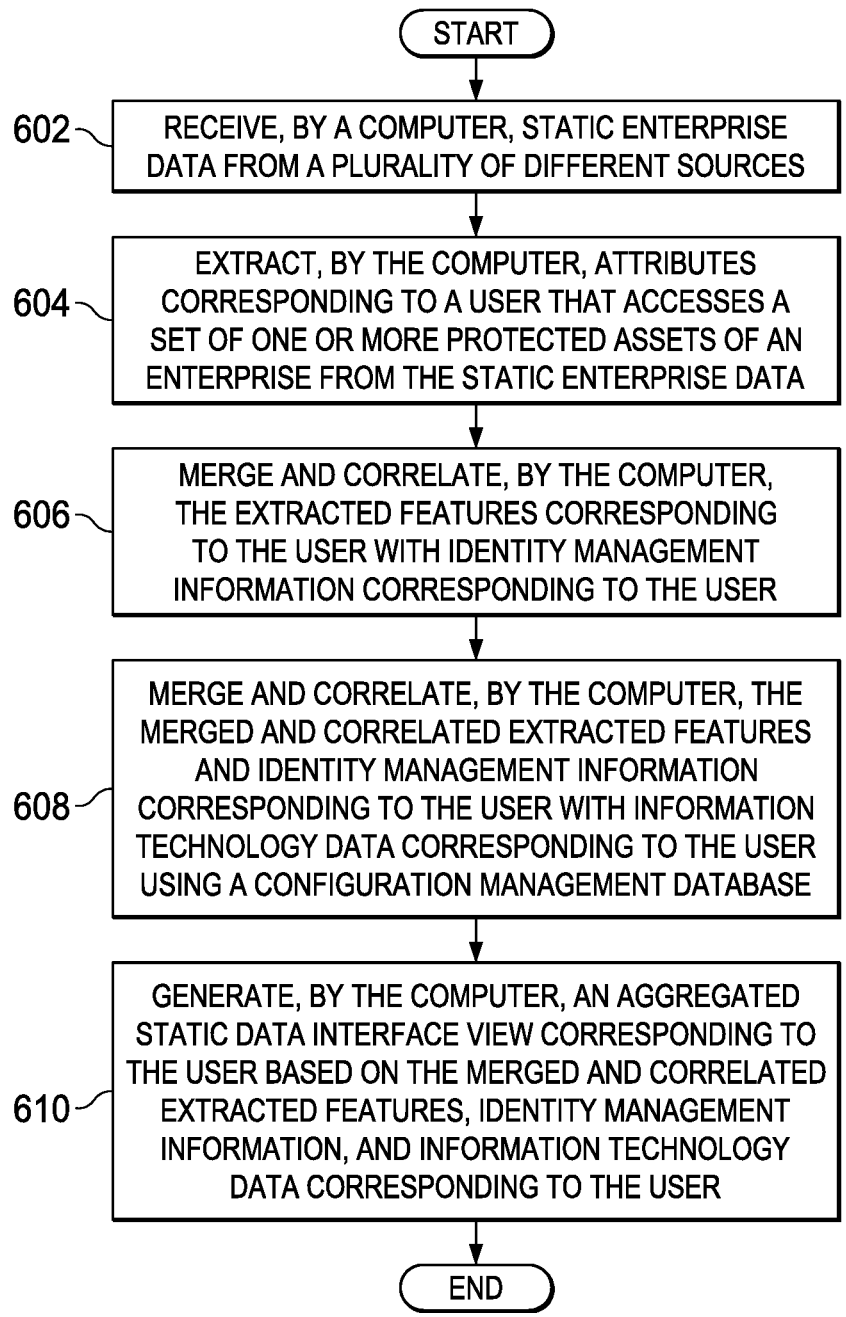
FIG. 6 is a flowchart illustrating a process for aggregating static user data in accordance with an alternative illustrative embodiment.

With reference now to FIG. 6, a flowchart illustrating a process for aggregating static user data is shown in accordance with an alternative illustrative embodiment. The process shown in FIG. 6 may be implemented in a computer, such as, for example, server 104 FIG. 1 and data processing system 200 in FIG. 2.

The process begins when the computer receives static enterprise data from a plurality of different sources (step 602). The static enterprise data may be, for example, static user data 304 in FIG. 3. Then, the computer extracts attributes corresponding to a user that accesses a set of one or more protected assets of an enterprise from the static enterprise data (step 604). The attributes may be, for example, directory information 304A in FIG. 3.

Subsequently, the computer merges and correlates the extracted features corresponding to the user with identity management information corresponding to the user (step 606). The identity management information may be, for example, identity management information 304B in FIG. 3. Afterward, the computer merges and correlates the merged and correlated extracted features and identity management information corresponding to the user with information technology data corresponding to the user using a configuration management database (step 608). The information technology data may be, for example, information technology asset information 304C in FIG. 3.

In addition, the computer generates an aggregated static data interface view corresponding to the user based on the merged and correlated extracted features, identity management information, and information technology data corresponding to the user (step 610). The aggregated static data interface view may include, for example, basic user view 402, identity management view 404, and configuration management database view 406 in FIG. 4. Thereafter, the process terminates.

Figure 7:
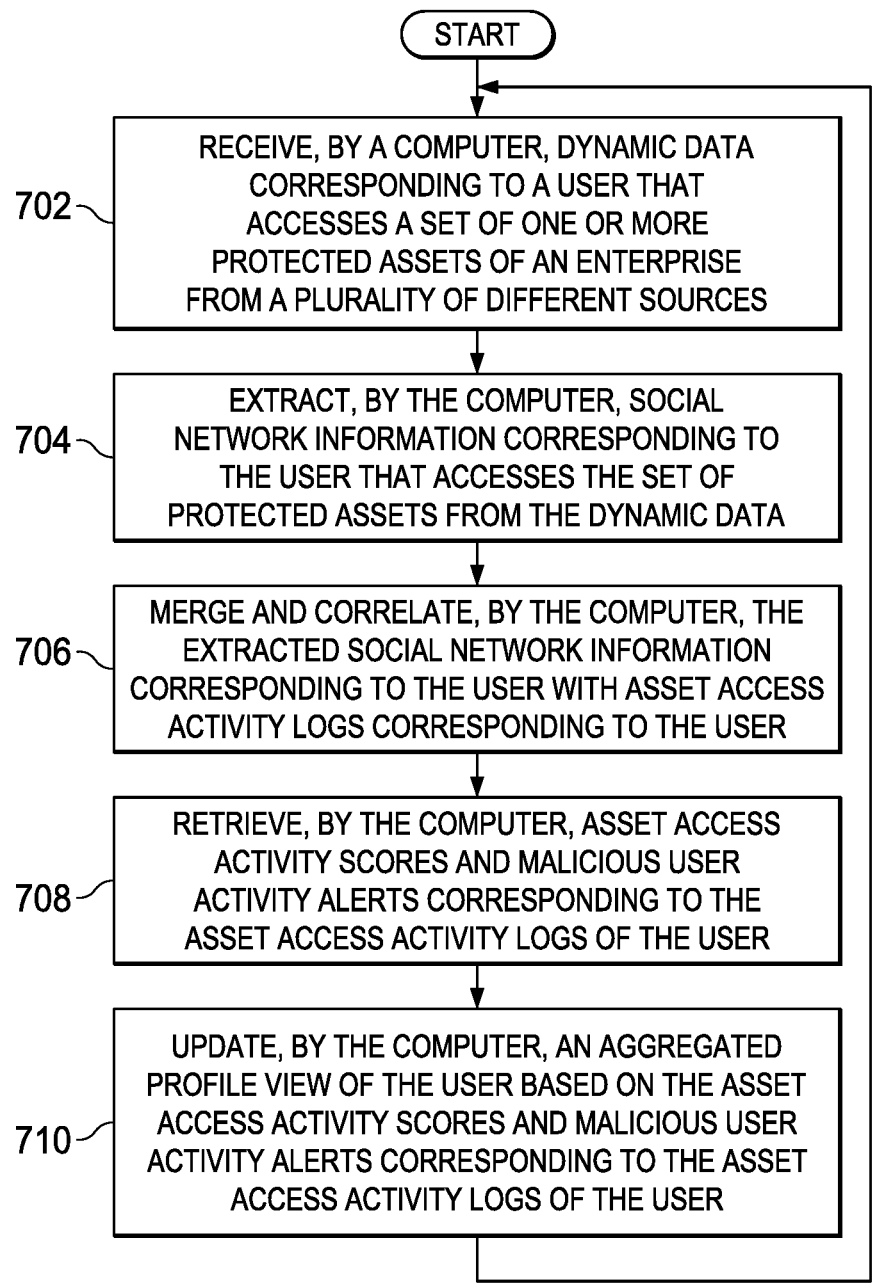
FIG. 7 is a flowchart illustrating a process for aggregating dynamic user data in accordance with an alternative illustrative embodiment.

With reference now to FIG. 7, a flowchart illustrating a process for aggregating dynamic user data is shown in accordance with an alternative illustrative embodiment. The process shown in FIG. 7 may be implemented in a computer, such as, for example, server 104 FIG. 1 and data processing system 200 in FIG. 2.

The process begins when the computer receives dynamic data corresponding to a user that accesses a set of one or more protected assets of an enterprise from a plurality of different sources (step 702). The dynamic data may be, for example, dynamic user data 306 in FIG. 3. Subsequently, the computer extracts social network information corresponding to the user that accesses the set of protected assets from the dynamic data (step 704). The social network information may be, for example, social networks 306B in FIG. 3.

The computer merges and correlates the extracted social network information corresponding to the user with asset access activity logs corresponding to the user (step 706). The asset access activity logs may be, for example, activity logs 306A in FIG. 3. The computer also retrieves asset access activity scores and malicious user activity alerts corresponding to the asset access activity logs of the user (step 708). The access activity scores and malicious user activity alerts may be, for example, user asset access activity scores 228 and malicious user activity alerts 232 in FIG. 2.

The computer also updates an aggregated profile view of the user based on the asset access activity scores and malicious user activity alerts corresponding to the asset access activity logs of the user (step 710). The aggregated profile view of the user may be, for example, aggregated user profile view 340 in FIG. 3. Thereafter, the process terminates.

Figure 8:
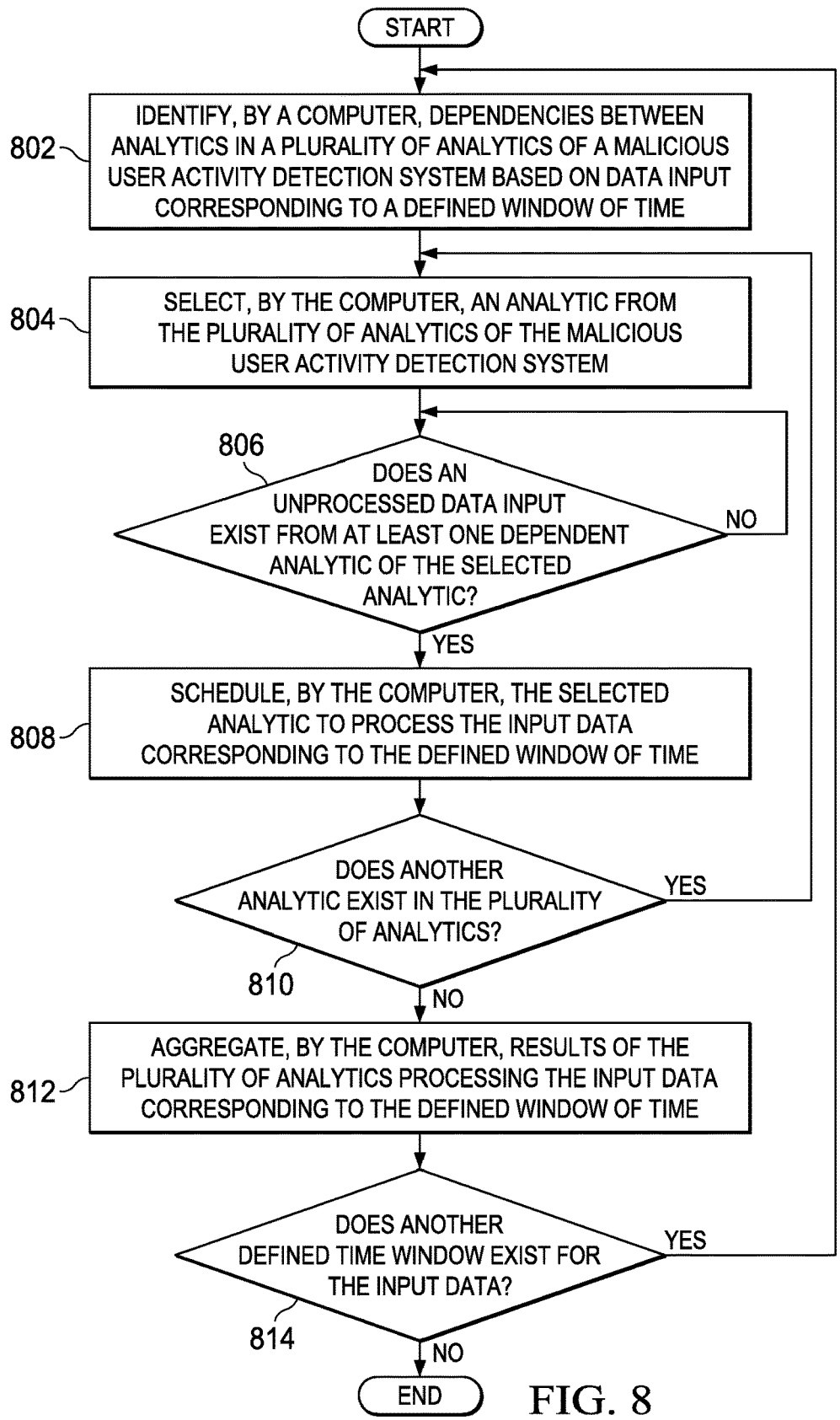
FIG. 8 is a flowchart illustrating a process for scheduling analytics in accordance with an alternative illustrative embodiment.

With reference now to FIG. 8, a flowchart illustrating a process for scheduling analytics is shown in accordance with an alternative illustrative embodiment. The process shown in FIG. 8 may be implemented in a computer, such as, for example, server 104 FIG. 1 and data processing system 200 in FIG. 2.

The process begins when the computer identifies dependencies between analytics in a plurality of analytics of a malicious user activity detector based on data input corresponding to a defined window of time (step 802). The plurality of analytics of the malicious user activity detector may be, for example, analytic 1 326, analytic 2 328, and analytic i 330 of malicious user activity detector 302 in FIG. 3. Afterward, the computer selects an analytic from the plurality of analytics of the malicious user activity detection system (step 804).

In addition, the computer makes a determination as to whether an unprocessed data input exists from at least one dependent analytic of the selected analytic (step 806). If the computer determines that an unprocessed data input does not exist from at least one dependent analytic of the selected analytic, no output of step 806, then the process returns to step 806 where the computer waits for unprocessed data input from the at least one dependent analytic. If the computer determines that an unprocessed data input does exist from at least one dependent analytic of the selected analytic, yes output of step 806, then the computer schedules the selected analytic to process the input data corresponding to the defined window of time (step 808).

Further, the computer makes a determination as to whether another analytic exists in the plurality of analytics (step 810). If the computer determines that another analytic does exist in the plurality of analytics, yes output of step 810, then the process returns to step 804 where the computer selects another analytic. If the computer determines that another analytic does not exist in the plurality of analytics, no output of step 810, then the computer aggregates results of the plurality of analytics processing the input data corresponding to the defined window of time (step 812). The aggregated results may be, for example, aggregated risk score k 336 in FIG. 3.

Furthermore, the computer makes a determination as to whether another defined time window exists for the input data (step 814). If the computer determines that another defined time window does exist for the input data, yes output of step 814, then the process returns to step 802 where the computer identifies dependencies between analytics corresponding to the other defined time window. If the computer determines that another defined time window does not exist for the input data, no output of step 814, then the process terminates thereafter.

Figure 9:
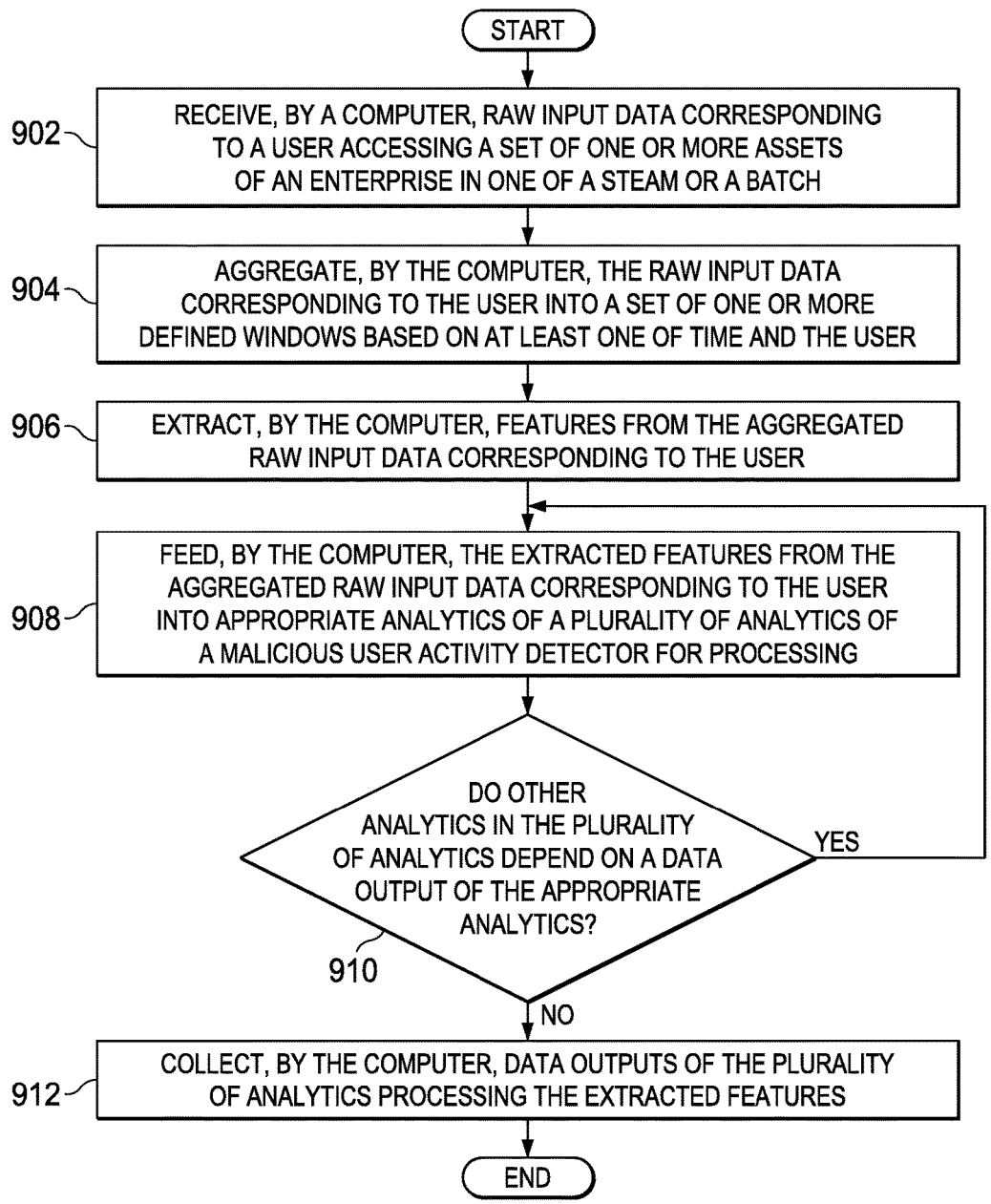
FIG. 9 is a flowchart illustrating a process for executing analytics in a pipeline in accordance with an alternative illustrative embodiment.

With reference now to FIG. 9, a flowchart illustrating a process for executing analytics in a pipeline is shown in accordance with an alternative illustrative embodiment. The process shown in FIG. 9 may be implemented in a computer, such as, for example, server 104 FIG. 1 and data processing system 200 in FIG. 2.

The process begins when the computer receives raw input data corresponding to a user accessing a set of one or more assets of an enterprise in one of a steam or a batch (step 902). The set of one or more assets of the enterprise may be, for example, assets 116 in FIG. 1. The computer aggregates the raw input data corresponding to the user into a set of one or more defined windows based on at least one of time and the user (step 904). The computer also extracts features from the aggregated raw input data corresponding to the user (step 906). The extracted features may be, for example, feature 1 318, feature 2 320, and feature i 322 in FIG. 3.

In addition, the computer feeds the extracted features from the aggregated raw input data corresponding to the user into appropriate analytics of a plurality of analytics of a malicious user activity detector for processing (step 908). The appropriate analytics of the malicious user activity detector may be, for example, analytic 1 326, analytic 2 328, and analytic i 330 of malicious user activity detector 302 in FIG. 3.

Further, the computer makes a determination as to whether other analytics in the plurality of analytics depend on a data output of the appropriate analytics (step 910). If the computer determines that other analytics in the plurality of analytics do depend on a data output of the appropriate analytics, yes output of step 910, then the process returns to step 908 where the computer feeds the extracted features into the other analytics that are dependent on the data output of the appropriate analytics. If the computer determines that other analytics in the plurality of analytics do not depend on a data output of the appropriate analytics, no output of step 910, then the computer collects data outputs of the plurality of analytics processing the extracted features (step 912). Thereafter, the process terminates.

Thus, illustrative embodiments of the present invention provide a computer-implemented method, computer system, and computer program product for monitoring user activity logs corresponding to access of a set of one or more protected assets of an enterprise by a user to identify and block malicious or anomalous user behavior by generating a risk score for the access based on a profile corresponding to the user accessing the set of assets. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for detecting malicious user activity, the computer-implemented method comprising:
   generating, by a computer, a profile for a user that accesses a set of protected assets, the profile generated based on static information representing an organizational view and associated attributes corresponding to the user and based on dynamic information representing observable actions made by the user;
   applying, by the computer, a plurality of analytics on the profile corresponding to the user to generate an aggregate risk score for the user accessing the set of protected assets based on the applying of the plurality of analytics on the profile of the user;
   generating, by the computer, a malicious user activity alert in response to the aggregate risk score for the user accessing the set of protected assets being greater than an alert threshold value;
   sending, by the computer, the malicious user activity alert that was generated in response to the aggregate risk score for the user accessing the set of protected assets being greater than the alert threshold value to an analyst for feedback;
   receiving, by the computer, the feedback corresponding to the malicious user activity alert; and
   applying, by the computer, the feedback to the malicious user activity alert;
   wherein the static information representing the organizational view and associated attributes corresponding to the user includes at least one of: information in human resource records of the user; information regarding the user in a directory of employees of an enterprise that employs the user; identity management information of the user including asset access account and privilege information, roles, and work-related groups of the user; configuration management database information including information regarding information technology assets owned or administered by the user; and social networks the user belongs to; and
   wherein the dynamic information representing observable actions made by the user includes at least one of: activities performed by the user on social networks; communication patterns of the user on the social networks; work-related asset access activities performed by the user; network and device access behaviors of the user; external threat feeds associated with the user; enterprise physical facility access behaviors of the user; and past asset access behavior of the user.

2. The computer-implemented method of claim 1 further comprising:
   blocking, by the computer, the user from accessing the set of protected assets based on the malicious user activity alert.

3. The computer-implemented method of claim 1 further comprising:
   prioritizing, by the computer, the malicious user activity alert based on the applied feedback.

4. The computer-implemented method of claim 1 further comprising:
   identifying, by the computer, dependencies between analytics in the plurality of analytics of a malicious user activity detector based on data input corresponding to a defined window of time; and
   determining, by the computer, whether an unprocessed data input exists from at least one dependent analytic of a selected analytic in the plurality of analytics.

5. The computer-implemented method of claim 4 further comprising:
   responsive to the computer determining that an unprocessed data input does not exist from at least one dependent analytic of the selected analytic, waiting, by the computer, for the unprocessed data input from the at least one dependent analytic; and
   responsive to the computer determining that an unprocessed data input does exist from the at least one dependent analytic of the selected analytic, scheduling, by the computer, the selected analytic to process the input data corresponding to the defined window of time.

6. The computer-implemented method of claim 4 further comprising:
   responsive to the computer determining that another analytic does not exist in the plurality of analytics, aggregating, by the computer, results of the plurality of analytics processing the input data corresponding to the defined window of time.

7. The computer-implemented method of claim 1 further comprising:
   receiving, by the computer, input data corresponding to the user accessing the set of protected assets in one of a steam or a batch; and
   aggregating, by the computer, the input data corresponding to the user into a set of one or more defined windows based on at least one of time and the user.

8. The computer-implemented method of claim 7 further comprising:
   extracting, by the computer, features from the aggregated input data corresponding to the user using a parallel feature extraction process that processes various representations of same data to support multiple analytics on the same data; and
   feeding, by the computer, the extracted features from the aggregated input data corresponding to the user into selected analytics of a plurality of analytics of a malicious user activity detector for parallel processing by the selected analytics.

9. The computer-implemented method of claim 8 further comprising:
  determining, by the computer, whether other analytics in the plurality of analytics depend on a data output of the selected analytics;
  responsive to the computer determining that other analytics in the plurality of analytics do depend on the data output of the selected analytics, feeding, by the computer, the extracted features into the other analytics that dependent on the data output of the selected analytics; and
  responsive to the computer determining that other analytics in the plurality of analytics do not depend on the data output of the selected analytics, collecting, by the computer, data outputs of the plurality of analytics processing the extracted features.

10. A computer system for detecting malicious user activity, the computer system comprising:
  a bus system;
  a storage device connected to the bus system, wherein the storage device stores program instructions; and
  a processor connected to the bus system, wherein the processor executes the program instructions to:
  generate a profile for a user that accesses a set of protected assets, the profile generated based on static information representing an organizational view and associated attributes corresponding to the user and based on dynamic information representing observable actions made by the user;
  apply a plurality of analytics on the profile corresponding to the user to generate an aggregate risk score for the user accessing the set of protected assets based on applying the plurality of analytics on the profile of the user;
  generate a malicious user activity alert in response to the aggregate risk score for the user accessing the set of protected assets being greater than an alert threshold value;
  send the malicious user activity alert that was generated in response to the aggregate risk score for the user accessing the set of protected assets being greater than the alert threshold value to an analyst for feedback;
  receive the feedback corresponding to the malicious user activity alert; and apply the feedback to the malicious user activity alert;
  wherein the static information representing the organizational view and associated attributes corresponding to the user includes at least one of: information in human resource records of the user; information regarding the user in a directory of employees of an enterprise that employs the user; identity management information of the user including asset access account and privilege information, roles, and work-related groups of the user; configuration management database information including information regarding information technology assets owned or administered by the user; and social networks the user belongs to; and
  wherein the dynamic information representing observable actions made by the user includes at least one of: activities performed by the user on social networks; communication patterns of the user on the social networks; work-related asset access activities performed by the user; network and device access behaviors of the user; external threat feeds associated with the user; enterprise physical facility access behaviors of the user; and past asset access behavior of the user.

11. The computer system of claim 10, wherein the processor further executes the program instructions to:
  block the user from accessing the set of protected assets based on the malicious user activity alert.

12. The computer system of claim 10, wherein the processor further executes the program instructions to:
  prioritize the malicious user activity alert based on the applied feedback.

13. A computer program product for detecting malicious user activity, the computer program product stored on a non-transitory computer readable storage medium having program instructions embodied therewith, the program instructions executable by a computer to cause the computer to perform a method comprising:
  generating, by a computer, a profile for a user that accesses a set of protected assets, the profile generated based on static information representing an organizational view and associated attributes corresponding to the user and based on dynamic information representing observable actions made by the user;
  applying, by the computer, a plurality of analytics on the profile corresponding to the user to generate an aggregate risk score for the user accessing the set of protected assets based on the applying of the plurality of analytics on the profile of the user;
  generating, by the computer, a malicious user activity alert in response to the aggregate risk score for the user accessing the set of protected assets being greater than an alert threshold value;
  sending, by the computer, the malicious user activity alert that was generated in response to the aggregate risk score for the user accessing the set of protected assets being greater than the alert threshold value to an analyst for feedback;
  receiving, by the computer, the feedback corresponding to the malicious user activity alert; and
  applying, by the computer, the feedback to the malicious user activity alert;
  wherein the static information representing the organizational view and associated attributes corresponding to the user includes at least one of: information in human resource records of the user; information regarding the user in a directory of employees of an enterprise that employs the user; identity management information of the user including asset access account and privilege information, roles, and work-related groups of the user; configuration management database information including information regarding information technology assets owned or administered by the user; and social networks the user belongs to; and
  wherein the dynamic information representing observable actions made by the user includes at least one of: activities performed by the user on social networks; communication patterns of the user on the social networks; work-related asset access activities performed by the user; network and device access behaviors of the user; external threat feeds associated with the user; enterprise physical facility access behaviors of the user; and past asset access behavior of the user.

14. The computer program product of claim 13 further comprising:
  blocking, by the computer, the user from accessing the set of protected assets based on the malicious user activity alert.

15. The computer program product of claim 13 further comprising:

prioritizing, by the computer, the malicious user activity alert based on the applied feedback.

16. The computer program product of claim 13, wherein the static information representing the organizational view and associated attributes corresponding to the user includes: information in human resource records of the user; information regarding the user in a directory of employees of an enterprise that employs the user; identity management information of the user including asset access account and privilege information, roles, and work-related groups of the user; configuration management database information including information regarding information technology assets owned or administered by the user; and social networks the user belongs to.

17. The computer program product of claim 16, wherein the dynamic information representing observable actions made by the user includes: activities performed by the user on social networks; communication patterns of the user on the social networks; work-related asset access activities performed by the user; network and device access behaviors of the user; external threat feeds associated with the user; enterprise physical facility access behaviors of the user; and past asset access behavior of the user.

18. The computer program product of claim 13 further comprising:
  identifying, by the computer, dependencies between analytics in the plurality of analytics of a malicious user activity detector based on data input corresponding to a defined window of time; and
  determining, by the computer, whether an unprocessed data input exists from at least one dependent analytic of a selected analytic in the plurality of analytics.

* * * * *